United States Patent [19]

Han

[11] Patent Number: 5,838,896
[45] Date of Patent: Nov. 17, 1998

[54] CENTRAL PROCESSING UNIT FOR PREVENTING PROGRAM MALFUNCTION

[75] Inventor: Dae Keun Han, Choongcheongbuk-Do, Rep. of Korea

[73] Assignee: LG Semicon Co., Ltd., Choongcheongbuk, Rep. of Korea

[21] Appl. No.: 773,934

[22] Filed: Dec. 30, 1996

[30] Foreign Application Priority Data

Dec. 31, 1995 [KR] Rep. of Korea ............... 1995 70175

[51] Int. Cl.$^6$ ................................................ G06F 11/00
[52] U.S. Cl. ............................ 395/182.21; 395/185.02; 395/800.01; 395/392
[58] Field of Search ............. 395/182.21, 185.01, 395/185.02, 185.03, 185.04, 185.06, 185.07, 800.01, 800.32, 280, 381, 383, 384, 390, 392, 394, 200.3

[56] References Cited

U.S. PATENT DOCUMENTS

| | | | |
|---|---|---|---|
| 4,493,035 | 1/1985 | MacGregor et al. | 395/182.19 |
| 4,571,677 | 2/1986 | Hirayama et al. | 395/185.02 |
| 4,626,988 | 12/1986 | George . | |
| 4,747,045 | 5/1988 | Harigai et al. | 395/383 |
| 4,831,572 | 5/1989 | Sekiguchi | 364/715.011 |
| 5,243,705 | 9/1993 | Nakagawa | 395/264.4 |
| 5,299,320 | 3/1994 | Aono et al. | 395/800.34 |
| 5,361,371 | 11/1994 | Kawamoto et al. | 364/715.001 |
| 5,367,550 | 11/1994 | Ishida | 395/383 |
| 5,440,704 | 8/1995 | Itomitsu et al. | 395/586 |
| 5,751,984 | 5/1998 | Chang et al. | 395/392 |
| 5,754,806 | 5/1998 | Yu | 395/376 |

*Primary Examiner*—Albert DeCady

[57] ABSTRACT

An improved CPU for preventing a program malfunction which is capable of preventing a malfunction of a program by resetting the CPU when an abnormal data is fetched from a memory due to a noise, which includes a program counter for designating an address of an instruction to be executed, a first instruction register for storing an instruction outputted from a memory by the program counter, a second instruction register for fetching an instruction stored in the first instruction register in accordance with a first internal clock signal, a third instruction register for fetching an instruction stored in the first instruction register in accordance with a second internal clock signal, a comparator, which is operated in accordance with an enable signal, for comparing whether instructions stored in the second instruction register and the third instruction register are identical, a reset controller for outputting a reset signal in accordance with an output signal from the comparator, an instruction decoder for decoding an operation code of an instruction stored in the third instruction register in accordance with an output signal from the comparator and for outputting a control signal and a program count value change instruction, and an execution unit for executing an instruction in accordance with a control signal from the instruction decoder.

6 Claims, 3 Drawing Sheets

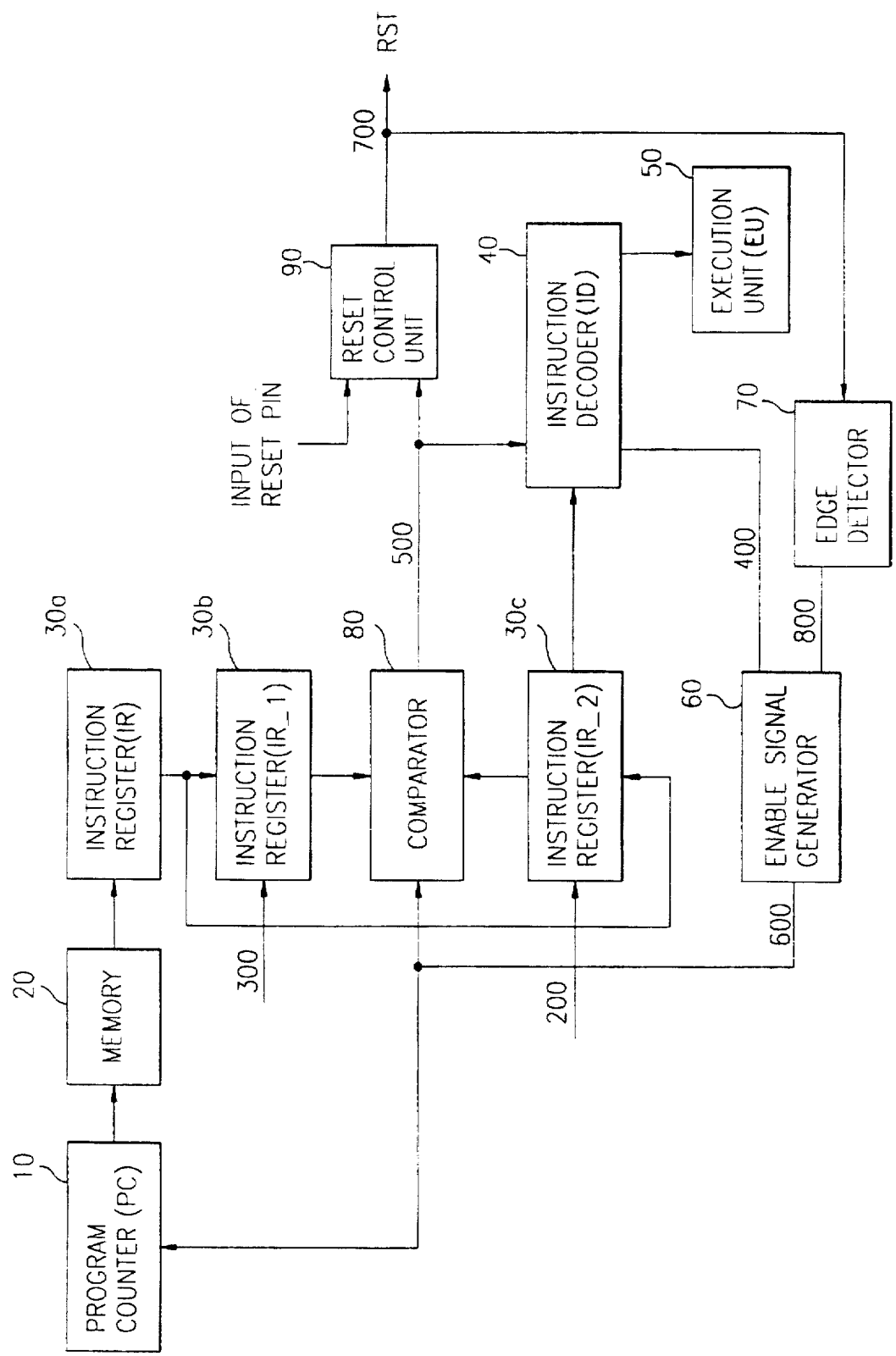

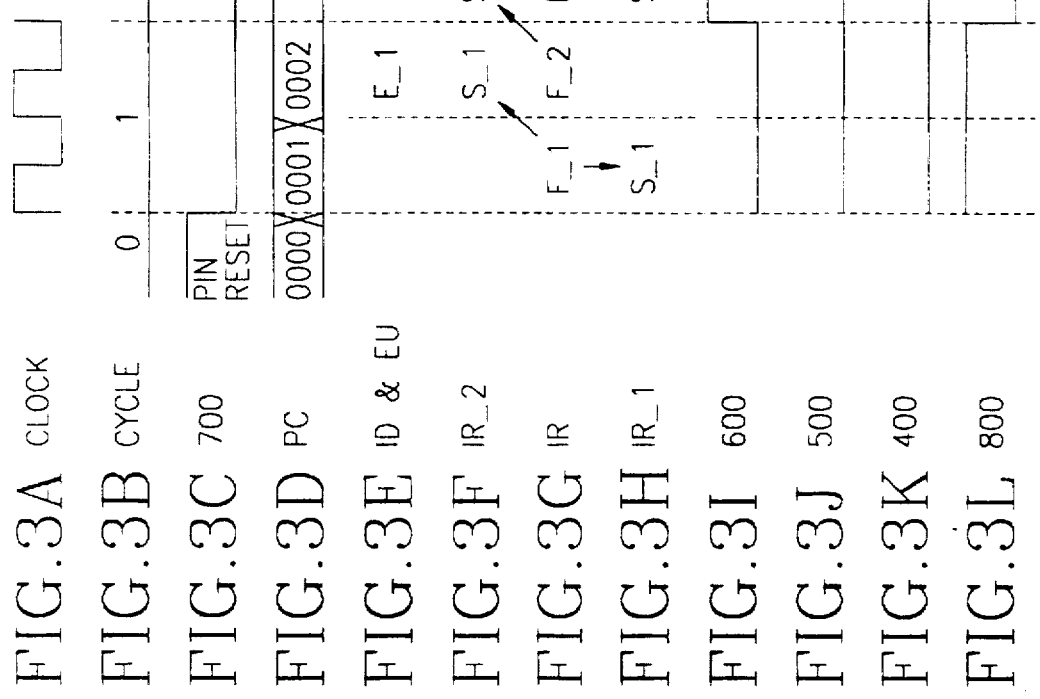

CENTRAL PROCESSING UNIT FOR PREVENTING PROGRAM MALFUNCTION

BACKGROUND OF THE INVENTION

1. Field of the Invention

The present invention relates to a central processing unit (CPU) for preventing a program malfunction, and in particular to an improved CPU for preventing a program malfunction which is capable of preventing a malfunction of a program by resetting the CPU when an abnormal data is fetched from a memory due to a noise.

2. Description of the Conventional Art

FIG. 1 is a block diagram illustrating a conventional central processing unit (CPU).

As shown therein, the conventional CPU includes a program counter 1 for designating an address of an instruction to be executed, a memory 2 for outputting an instruction of the address designated by the program counter 1, an instruction register 3 for storing an operation code "opcode" of the instruction outputted from the memory 2, an instruction decoder 4 for decoding the operation code stored in the instruction register 3 and for outputting a control signal, and an execution unit 5 for executing an instruction in accordance with the control signal from the instruction decoder 4.

The operation of the conventional CPU will now be explained with reference to FIG. 1.

The program counter 1 transmits the address of the instruction to be executed next to the memory 2 through an address bud, and the memory 2 outputs a corresponding instruction in cooperation with the program counter 1.

The instruction register stores the operation code of the instruction from the memory 2 and outputs the code to the instruction decoder 4. The instruction decoder 4 decodes the operation code supplied thereto, and transmits the control signal which is necessary for executing the instruction to the execution unit 5. Therefore, the execution unit 5 executes the instruction.

However, the conventional CPU may execute an undesired instruction due to a noise therein, thus causing a program operation malfunction. Namely, when a noise is introduced in an external power of the system or a clock signal, the program counter 1 is operated, and an undesired instruction is fetched from the memory 2, for thus causing the program operation malfunction.

SUMMARY OF THE INVENTION

Accordingly, it is an object of the present invention to provide a central processing unit (CPU) for preventing a program malfunction which overcomes the problems encountered in the conventional art.

It is another object of the present invention to provide a CPU for preventing a program malfunction which is capable of preventing a malfunction of a program by resetting the CPU when an abnormal data is fetched from a memory due to a noise.

To achieve the above objects, there is provided a CPU for preventing a program malfunction which includes a program counter for designating an address of an instruction to be executed, a first instruction register for storing an instruction outputted from a memory by the program counter, a second instruction register for fetching an instruction stored in the first instruction register in accordance with a first internal clock signal, a third instruction register for fetching an instruction stored in the first instruction register in accordance with a second internal clock signal, a comparator, which is operated in accordance with an enable signal, for comparing whether instructions stored in the second instruction register and the third instruction register are identical, a reset controller for outputting a reset signal in accordance with an output signal from the comparator, an instruction decoder for decoding an operation code of an instruction stored in the third instruction register in accordance with an output signal from the comparator and for outputting a control signal and a program count value change instruction, an execution unit for executing an instruction in accordance with a control signal from the instruction decoder, an edge detector for detecting an edge of an output signal from the reset controller and for outputting an edge detection signal, and an enable signal generator for outputting an enable signal in accordance with the edge detection signal and an output signal from the instruction decoder.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram illustrating a CPU according to the present invention; and FIGS. 3A through 3L are timing diagrams in order to explain the operation of the CPU of FIG. 2.

DETAILED DESCRIPTION OF THE INVENTION

Figure 1:
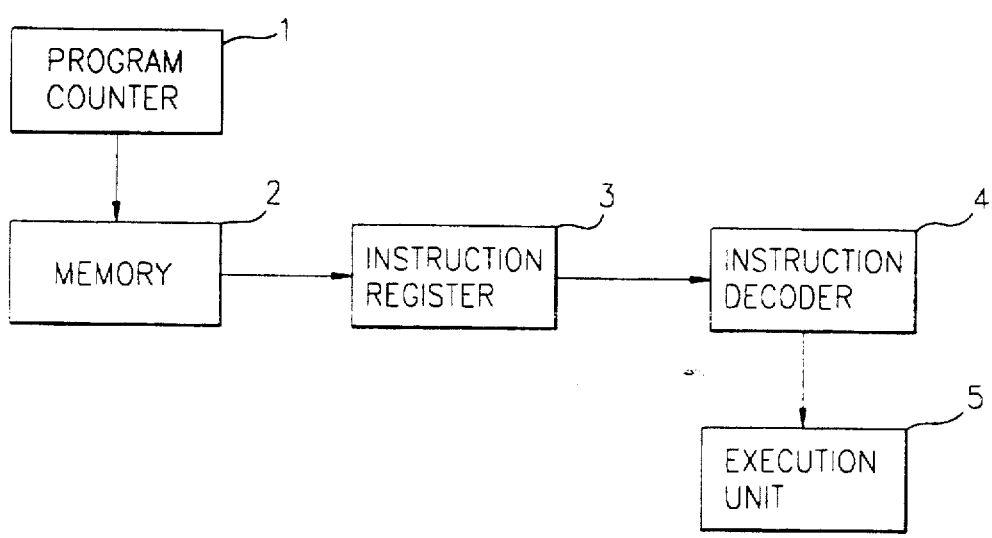
FIG. 1 is a block diagram illustrating a conventional central processing unit (CPU)

FIG. 2 is a block diagram illustrating a central processing unit (CPU) according to the present invention.

The CPU according to the present invention includes a program counter (PC) 10 for designating the address of an instruction to be executed, an instruction register (IR) 30a for storing the instruction outputted from a memory 20 by the program counter (PC) 10, an instruction register (IR_1) 30b for fetching the instruction stored in the instruction register 30a in accordance with an internal clock signal 400, an instruction register (IR_2) 30c for fetching the instruction stored in the instruction register (IR) 30a in accordance with an internal clock signal 200, a comparator 80, which is operated in accordance with an enable signal 600, for comparing whether the instructions stored the instruction register (IR_1) 30b and the instruction registers (IR_2) 30c are identical, an instruction decoder (ID) 40 for decoding the instruction code of the instruction stored in the instruction register (IR_2) 30c in accordance with an output signal 500 from the comparator 80 and for outputting a control signal and a counter value change instruction 400, an execution unit (EU) 50 for executing the instruction in accordance with the control signal from the instruction decoder (ID) 40, an edge detector 70 for detecting the edge of an output signal 700 from a reset controller and for outputting an edge detection signal 800, and an enable signal generator 60 for outputting an enable signal 600 in accordance with the edge detection signal and an output signal 400 from the instruction decoder (ID) 40.

The operation of the CPU for preventing a program malfunction according to the present invention will now be explained with reference to FIGS. 2 and 3L.

The instructions fetched from the memory 20 in accordance with the address designated by the program counter (PC) 10 are stored in the instruction register (IR) 30a in synchronization with the period of a system cycle, and the instructions stored in the instruction register (IR) 30a are alternately fetched at every period of the system clock, stored in the instruction registers (IR__1) 30b and (IR__2) 30c, and compared by the comparator 80.

Here, if the instructions stored in the instruction registers (IR__1) 30b and (IR__2) 30c are identical, the instruction stored in the instruction register (IR__2) 30c is executed by the execution unit (EU) 50, and if the instructions stored in the instruction registers (IR__1) 30b and (IR__2) 30c are not identical, the level of the reset signal 700 from a reset controller 90 is shifted, and the program counter (PC) 10 is reset.

The above-described processes will now be explained in more detail with reference to the timing diagrams as shown in FIG. 3.

In the present invention, two periods of the system clock as shown in FIG. 3A is assumed as one cycle.

Therefore, the instruction register (IR__1) 30b is turned on at a falling edge of a first system clock, and the instruction register (IR__2) 30c is turned on at a rising edge of a second system clock and at a rising edge at a start point of the second cycle.

If an external reset signal is inputted through a reset pin, the reset controller 90 outputs a reset signal 700 as shown in FIG. 3C, and resets the CPU.

Here, the edge detector 70, as shown in FIG. 3L, detects the falling edge of the reset detector 700 and maintains a high level for one cycle.

In addition, the enable signal generator 60 outputs a signal 600 of high level at every period of the system clock signal for each cycle. Here, a signal 600 of low level is outputted therefrom within the interval in which the output signal from the edge detector 70 and the output signal 400 from the instruction decoder (ID) 40 become high level.

Therefore, the enable signal generator 60 outputs a signal 600 of a low level for one cycle, and the program counter (PC) 10 enables the signal 600, and the comparator 80 disables the signal.

The program counter (PC) 10, as shown in FIG. 3D, increases the address of the instruction to be executed in synchronization with the system clock for a first cycle and outputs the signal to the memory 20, and the instruction register (IR) 30a fetches the instruction of addresses of 0001, 0002 from the memory 20 in synchronization with the system clock for one cycle as in (F__1) and (F__2).

Here, since the instruction register (IR__1) 30b is turned on at a falling edge of a first system clock in accordance with a control signal 300, and the instruction register (IR__1) 30b stores a first address instruction shifted by the instruction register (IR) 30a.

In addition, in the drawings, "En" denotes that the instruction of "n" address is executed by the execution unit (EU) 50, "Fn" denotes that the instruction of "n" address is fetched from the memory 20, and "Sn" denotes that the instruction of "n" address from the memory 20 stored in the instruction register 30a is shifted to the instruction registers (IR__1) 30b and (IR__2) 30c.

Since the instruction register (IR__2) 30c is turned on at a rising edge of a second system clock and at a rising edge of a start point of the second cycle in accordance with the control signal 200, the instruction register (IR__2) 30c is turned on a rising edge of a second system clock, for thus storing the first address instruction shifted by the instruction register (IR) 30a, and the instruction register (IR__2) 30c is turned on at a rising edge of a start point of the second cycle, for thus storing the second address instruction shifted by the instruction register (IR) 30a as in S__2'.

Here, the first address instruction shifted at the rising edge of the second system clock is decoded by the instruction decoder (ID) 40, and the instruction is executed by the execution unit (EU) 50.

Thereafter, when the routine is in the second cycle, since the output signal 800 from the edge detector 70 and the output signal 400 from the instruction decoder (ID) 40 are all low level, the enable signal generator 60, as shown in FIG. 3I, outputs the signal 600 of high level for one period of the system clock signal, the program counter (PC) 10 disables the signal, and the comparator 80 enables the signal.

As a result, the program counter (PC) 10 does not increase the address of the instruction to be executed for one period of the system clock signal.

In addition, the instruction register (IR__1) 30b is turned on at a falling edge of a first system clock in accordance with the control signal 300, for thus storing the second instruction (F__2') shifted by the instruction register (IR) 30a as in S__2.

Therefore, the comparator 80 is turned on for a first clock signal input interval of the second cycle, and the instruction as in S__2' stored in the instruction register (IR__1) 30b and the instruction as in S__2 stored in the instruction register (IR__2) 30c are compared. If the instruction stored in the instruction register (IR__1) 30b and the instruction stored in the instruction register (IR__2) are identical, the signal 600 of low level as shown in FIG. 3J is outputted.

Here, the program counter (PC) 10 becomes disabled, and the address of the execution instruction is not increased. Therefore, the second address instructions as in F__2 and F__2' stored in the instruction register (IR) 30a are the same instruction, and the instructions as in S__2 and S__2' shifted to the instruction register (IR__1) 30b are the identical instruction.

Thereafter, when the enable signal generator 60 outputs the signal of low level for one period of the second clock signal, the program counter (PC) 10 increases the address of the instruction to be re-executed, and the instruction register (IR) 30a fetches the instruction of an address of 0003 from the memory 20 in synchronization with the system clock signal as in F__3.

In addition, the instruction register (IR__2) 30c is turned on at a rising edge of the second system clock, for thus storing the second address instruction shifted by the instruction register (IR) 30a as in S__2, and is turned on at a rising edge of a start point of a third cycle, for thus storing the instruction of the third address shifted by the instruction register (IR) 30a.

Here, the instruction of the second address shifted from the rising edge of the second system clock is decoded by the instruction decoder (ID) 40, and is executed by the execution unit (EU) 50.

Thereafter, identically with the above-described processes, when the routine is in third cycle, the comparator 80 is enabled in accordance with the signal 600 of high level from the enable signal generator 60, and the program counter (PC) 10 does not increase the address of the execution command.

In addition, the instruction register (IR__1) 30b is turned on at a falling edge of the first system clock in accordance with the control signal 300, for thus storing the instruction of the third address shifted by the instruction register (IR) 30a as in S__3.

Therefore, the comparator 80 compares the instruction as in S__2' stored in the instruction register (IR__1) 30b with the instruction as in S__2 stored in the instruction register (IR__2) 30c for a first clock signal input interval of the third cycle, and outputs the signal 600 of low level as shown in FIG. 3J.

Thereafter, the instruction register (IR__2) 30c is turned on at a rising edge of the second system clock, for thus storing the third instruction as in F__3' shifted by the instruction register (IR) 30a as in S__3, and is turned on at a rising edge of a start point of the fourth cycle, for thus storing the instruction of the third address shifted by the instruction register (IR) 30a as in S__4'.

Here, the instruction of the third address shifted at a rising edge of the second system clock is decoded by the instruction decoder (ID) 40. If the instruction is referred to a jump to a seventeenth address as a result of the decoding of the third address instruction, the instruction decoder (ID) 40, as shown in FIG. 3K, outputs the instruction 400 which changes the value from the program counter (PC) 10 to the enable signal generator 60.

As a result, the program counter (PC) 10 jumps from the fourth cycle to the address of the seventeenth address instruction, and the enable signal generator 60 maintains the low level for one period of the fourth cycle, and the comparator 80 is disabled.

The remaining processes are performed in the same manner described above.

In addition, in the case that the instruction of a nineteenth address fetched from the memory for one period of the system clock of the sixth cycle is abnormal due to external electric power and noise, the instruction as in S__19 stored in the instruction register (IR__1) 30b and the instruction as in IR__19' stored in the instruction register (IR__2) 30c are not identical.

Therefore, the comparator 80, as shown in FIG. 3J, outputs a mismatch signal 500 of high level, and the reset controller 90, as shown in FIG. 3C, outputs an internal reset signal 700, for thus resetting the CPU.

In addition, after resetting the CPU, the operation after the seventh cycle is performed identically with the operation after the first cycle.

As described above, the central processing unit for preventing a program malfunction according to the present invention is basically directed to comparing instructions fetched from different system clock periods, executing the fetched instruction when the normal instructions are fetched, resetting the CPU when an abnormal data is fetched due to noise, for thus preventing the malfunction of the program stored in the memory.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A central processing unit for preventing a program malfunction, comprising:
   a program counter for designating an address of an instruction to be executed;
   a first instruction register for storing an instruction outputted from a memory by the program counter;
   a second instruction register for fetching an instruction stored in the first instruction register in accordance with a first internal clock signal;
   a third instruction register for fetching an instruction stored in the first instruction register in accordance with a second internal clock signal;
   a comparator, which is operated in accordance with an enable signal, for comparing whether instructions stored in the second instruction register and the third instruction register are identical;
   a reset controller for outputting a reset signal in accordance with an output signal from the comparator;
   an instruction decoder for decoding an operation code of an instruction stored in the third instruction register in accordance with an output signal from the comparator and for outputting a control signal and a program count value change instruction;
   an execution unit for executing an instruction in accordance with a control signal from the instruction decoder;
   an edge detector for detecting an edge of an output signal from the reset controller and for outputting an edge detection signal; and
   an enable signal generator for outputting an enable signal in accordance with the edge detection signal and an output signal from the instruction decoder.

2. The CPU of claim 1, wherein said first internal clock signal is a falling edge detection signal of a first system clock for one cycle, and said second internal signal is a rising edge detection signal of each system clock.

3. The CPU of claim 1, wherein said enable signal generator outputs an enable signal of high level for a first period of a system clock at each cycle.

4. The CPU of claim 3, wherein said enable signal generator outputs a low level signal irrespective of the period of the system clock when the edge detection signal or the output signal from the instruction decoder is high level.

5. The CPU of claim 1, wherein said second instruction register is turned on at a falling edge of a first system clock for each cycle, said third instruction register is turned on at a rising edge for a second system clock, and is turned on at a rising edge at a start point of the next cycle.

6. The CPU of claim 1, wherein said reset controller shifts the level of the reset signal when the instructions stored in the second instruction register and the third instruction register are different.

* * * * *